US012057615B2

(12) United States Patent
Chueh

(10) Patent No.: US 12,057,615 B2
(45) Date of Patent: Aug. 6, 2024

(54) BRANCH-LINE COUPLER

(71) Applicant: Nanning FuLian FuGui Precision Industrial Co., Ltd., Nanning (CN)

(72) Inventor: Yu-Chih Chueh, New Taipei (TW)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 321 days.

(21) Appl. No.: 17/458,410

(22) Filed: Apr. 1, 2022

(65) Prior Publication Data

US 2023/0062209 A1 Mar. 2, 2023

(30) Foreign Application Priority Data

Aug. 26, 2021 (CN) ......................... 202110988957.1

(51) Int. Cl.
*H01P 5/18* (2006.01)
*H01P 3/08* (2006.01)

(52) U.S. Cl.
CPC .................. *H01P 5/18* (2013.01); *H01P 3/08* (2013.01); *H01P 5/184* (2013.01)

(58) Field of Classification Search
CPC .... H01P 5/184; H01P 5/18; H01P 5/12; H01P 5/185; H01P 5/186; H01P 5/16; H01P 3/08
See application file for complete search history.

(56) References Cited

U.S. PATENT DOCUMENTS 10,644,375 B1 * 5/2020 Chueh ..................... H01P 5/184

FOREIGN PATENT DOCUMENTS

TW I640123 B 11/2018
TW I700858 B 8/2020

* cited by examiner

*Primary Examiner* — Stephen E. Jones
(74) *Attorney, Agent, or Firm* — ScienBiziP, P.C.

(57) ABSTRACT

A branch-line coupler of reduced size but comparable performance includes a first transmission line, a second transmission line, a first bent transmission line, and a second bent transmission line. The first transmission line includes a first strip transmission line, a first branch transmission line, and a second branch transmission line. The first strip transmission line extends along a predetermined direction, the first and second branch transmission lines being slotted. The first and second branch transmission lines are symmetrical around a first axis and around a second orthogonally-disposed axis. The first bent transmission line is electrically connected to the terminals of the first and second transmission lines on one side, and the second bent transmission line is electrically connected to the terminals of the first and second transmission lines on the other side.

20 Claims, 6 Drawing Sheets

BRANCH-LINE COUPLER

FIELD

The disclosure generally relates to branch-line couplers.

BACKGROUND

Branch-line couplers are widely applied to microwave integrated circuits and monolithic integrated circuits. The conventional branch-line coupler, such as the 3 dB branch-line coupler, is constituted by four quarter-wavelength lines. However, the branch-line coupler occupies a large area of the printed circuit board (PCB). Therefore, a reduced-size high performance 3 dB branch-line coupler would be preferred.

BRIEF DESCRIPTION OF THE DRAWINGS

Implementations of the present technology will now be described, by way of example only, with reference to the attached figures, wherein.

DETAILED DESCRIPTION

It should be understood that the detailed description and specific examples, while indicating exemplary embodiments, are intended for purposes of illustration only and are not intended to limit the scope of the claims.

Figure 1:
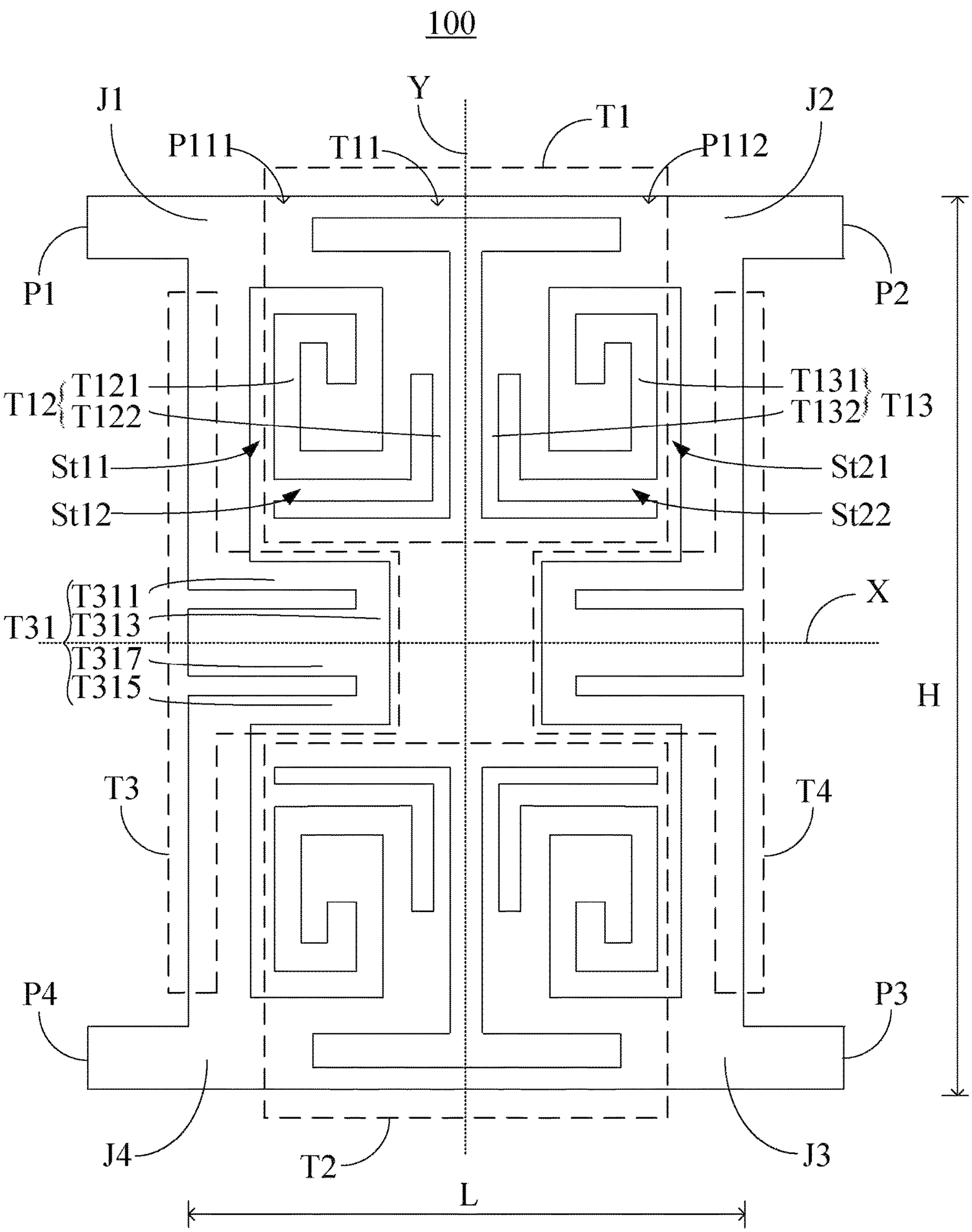
FIG. 1 is a schematic structural diagram of a branch-line coupler according to an embodiment of the disclosure.

FIG. 1 shows a schematic structural diagram of a branch-line coupler according to an embodiment of the disclosure. In the embodiment, the branch-line coupler 100 is symmetrical around axis X and around axis Y. As shown in FIG. 1, the branch-line coupler 100 comprises at least an input port P1, a first output port P2, a second output port P3, an isolated port P4, a first transmission line T1, a second transmission line T2, a first bent transmission line T3, and a second bent transmission line T4. The input port P1 receives electromagnetic signals, the first output port P2 outputs the electromagnetic signals, and the second output port P3 outputs coupled electromagnetic signals. The impedances of the input port P1, the first output port P2, the second output port P3, and the isolated port P4 shown in FIG. 1, and the configuration of the input port P1, the first output port P2, the second output port P3, and the isolated port P4 can be defined according to the user's needs, it is not limited thereto.

The first transmission line T1 comprises a first strip transmission line T11, a first branch transmission line T12, and a second branch transmission line T13. The first strip transmission line T11 has a terminal P111 electrically connected to the input port P1 and a terminal P112 electrically connected to the first output port P2. The first strip transmission line T11 is extended along a predetermined direction (the X direction in FIG. 1). The first branch transmission line T12 is electrically connected to the terminal P111, and comprises a spiral branch T121 and a strip branch T122. There is a slot St11 between the spiral branch T121 and the first bent transmission line T3, and a slot St12 between the spiral branch T121 and the strip branch T122. The second branch transmission line T13 is electrically connected to the terminal P112, and comprises a spiral branch T131 and a strip branch T132. There is a slot St21 between the spiral branch T131 and the second bent transmission line T4, and a slot St22 between the spiral branch T131 and the strip branch T132.

Figure 2:
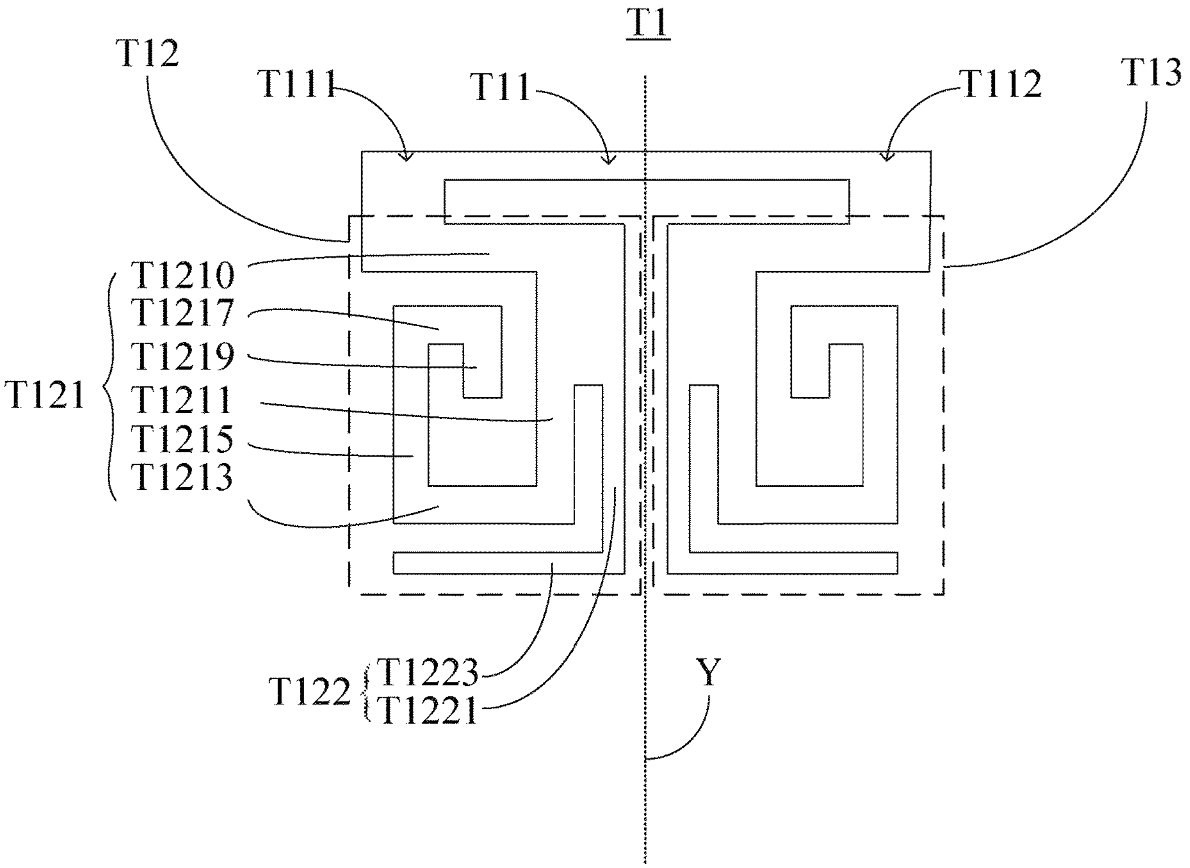
FIG. 2 is an enlarged schematic diagram of the first transmission line of the branch-line coupler shown in FIG. 1.

FIG. 2 shows the first transmission line of the branch-line coupler shown in FIG. 1. In FIG. 2, the first transmission line T1 according to an embodiment of the disclosure comprises a first strip transmission line T11, a first branch transmission line T12, and a second branch transmission line T13. The first branch transmission line T12 comprises a spiral branch T121 and a strip branch T122. The spiral branch T121 comprises branch segments T1210, T1211, T1213, T1215, T1217, and T1219.

The branch segment T1210 extends from the terminal P111 toward the second branch transmission line T13, the branch segment T1211 extends from the branch segment T1210 toward the direction away from the first strip transmission line T11, the branch segment T1213 extends from the branch segment T1211 toward the direction away from the second branch transmission line T13, the branch segment T1215 extends from the branch segment T1213 toward the first strip transmission line T11, the branch segment T1217 extends from the branch segment T1215 toward the second branch transmission line T13, and the branch segment T1219 extends from the branch segment T1217 toward the direction away from the first strip transmission line T11. The number of branch segments of the spiral branch T121 shown in the FIG. 2 is only an example, and those skilled in the art can select an appropriate number of branch segments to form the spiral branch T121 according to the characteristics of the branch-line coupler.

The strip branch T122 may be L-shaped and comprises a branch segment T1221 and a branch segment T1223. Those skilled in the art can select an appropriate length of the branch segment T1223 according to the characteristics of the branch-line coupler. The first strip transmission line T11 is parallel to the branch segments T1210, T1213, T1217, and T1223, and perpendicular to the branch segments T1211, T1215, T1219, and T1221. In addition, as shown in FIG. 2, the first branch transmission line T12 and the second branch transmission line T13 are symmetrical around axis Y. The detailed structure of the second branch transmission line T13 is not repeated here.

Referring to FIG. 1, the first bent transmission line T3 is electrically connected between the input port P1 and the isolated port P4, and comprises a fifth branch transmission line T31. The fifth branch transmission line T31 comprises branch segments T311, T313, and T315. The branch segment T311 extends along a predetermined direction (the X direction in FIG. 1) toward the second bent transmission line T4. The branch segment T313 connects the terminals of the branch segment T311 and the branch segment T315 near the second bent transmission line T4 and extends along the direction (the Y direction in FIG. 1) orthogonal to the predetermined direction X toward the second transmission line T2, and the branch segment T315 extends along the X direction away from the second bent transmission line T4. In this embodiment, the branch segments T311, T313, and T315 form the fifth branch transmission line T31. In other embodiments, the fifth branch transmission line T31 may further comprise a branch segment T317. The first strip transmission line T11 is parallel to the branch segments T311, T315, and T317, and perpendicular to the branch segment T313.

As shown in FIG. 1, the first bent transmission line T3 and the second bent transmission line T4 are symmetrical around the axis Y. The detailed structure of the second bent transmission line T4 is not repeated here. Similarly, the first transmission line T1 and the second transmission line T2 are symmetrical around the axis X, the detailed structure of the second transmission line T2 is not repeated here. According to the embodiment of the disclosure, the multi-branch design of the first branch transmission line T12 and the second branch transmission line T13 and the addition of a bent portion to the first bent transmission line T3 and the second bent transmission line T4 effectively reduces the size of the branch-line coupler 100.

The branch-line coupler 100 may comprise a first connection part J1, a second connection part J2, a third connection part J3, and a fourth connection part J4. The first transmission line T1 and the first bent transmission line T3 are electrically connected to the input port P1 through the connection portion J1, and the first transmission line T1 and the second bent transmission line T4 are electrically connected to the first output port P2 through the connection portion J2. The second transmission line T2 and the second bent transmission line T4 are electrically connected to the second output port P3 through the connection portion J3, and the second transmission line T2 and the first bent transmission line T3 are electrically connected to the isolated port P4 through the connection portion J4. In an embodiment, the first connection part J1, the second connection part J2, the third connection part J3, and the fourth connection part J4 can be transmission lines. In other embodiments, the first connection part J1, the second connection part J2, the third connection part J3, and the fourth connection part J4 can be microstrip lines or other type of transmission line.

According to an embodiment of the disclosure, the length L of the branch-line coupler 100 is 4.08 millimeters (mm), and the width H is 6.52 millimeters (mm). The size of the branch-line coupler 100 is determined according to the frequency of signals, and does not limit the present invention. Those skilled in the art can select branch-line couplers of different sizes to meet the requirements of different frequencies according to specific conditions.

Figure 3:
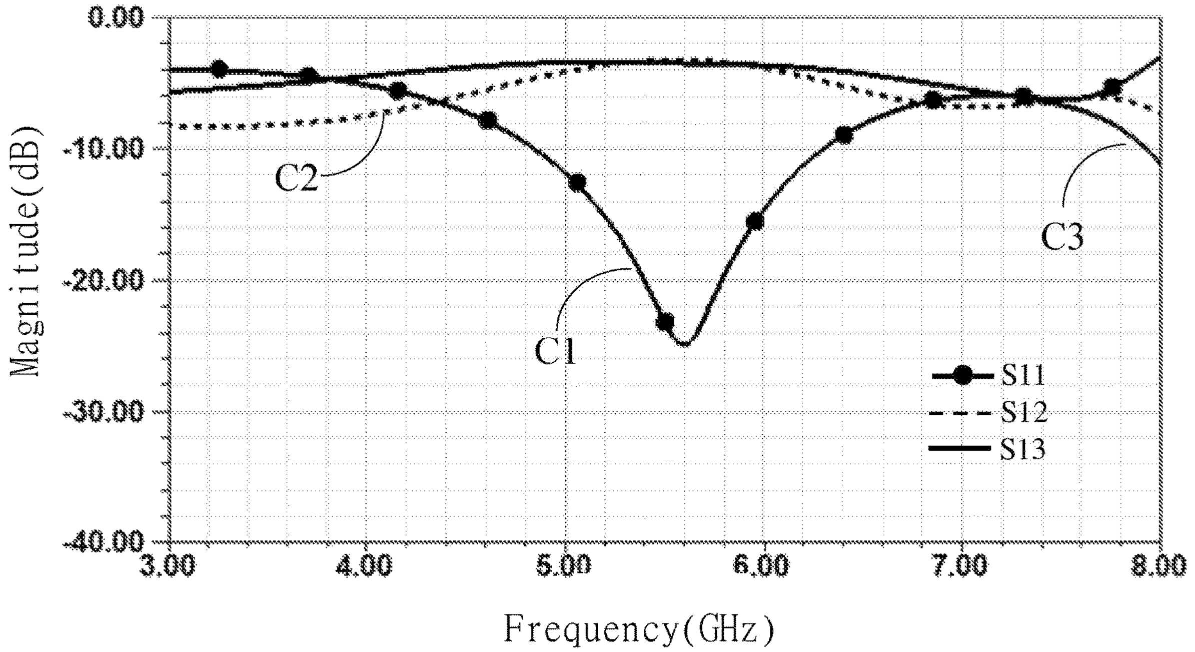
FIG. 3 is an s-parameter simulation diagram of the branch-line coupler according to an embodiment of the disclosure.

FIG. 3 shows an s-parameter simulation diagram of a branch-line coupler 100 according to an embodiment of the disclosure. As shown in curve C1 in FIG. 3, the frequency band of the branch-line coupler 100 corresponding to the parameter of S11 below −10 dB is between 4.8 GHz and 6.3 GHz, the center frequency is 5.6 GHz. As shown in curves C2 and C3, the S12 and S13 parameters have 3 dB power loss at that frequency band.

Figure 4:
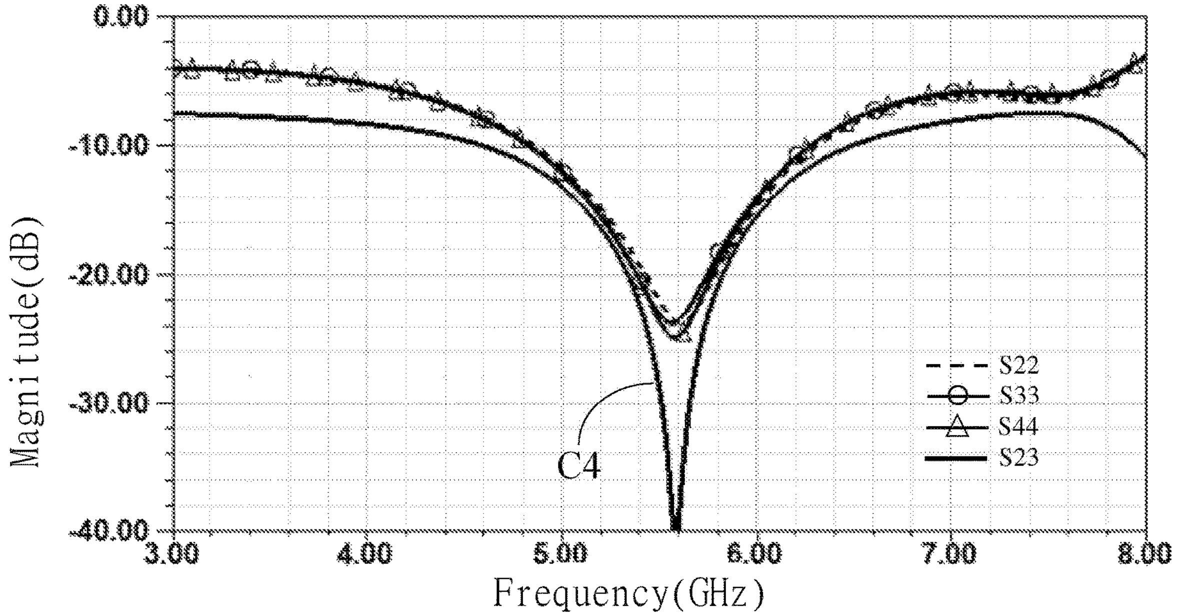
FIG. 4 is an s-parameter simulation diagram showing degree of isolation between two output ports of a branch-line coupler, according to an embodiment of the disclosure.

FIG. 4 shows an s-parameter simulation diagram of isolation degree of two output ports of a branch-line coupler 100 according to an embodiment of the disclosure. As shown in curve C4, the two outputs of the branch-line coupler 100 have a high degree of isolation at the frequency band of 4.6 GHz to 6.6 GHz.

Figure 5:
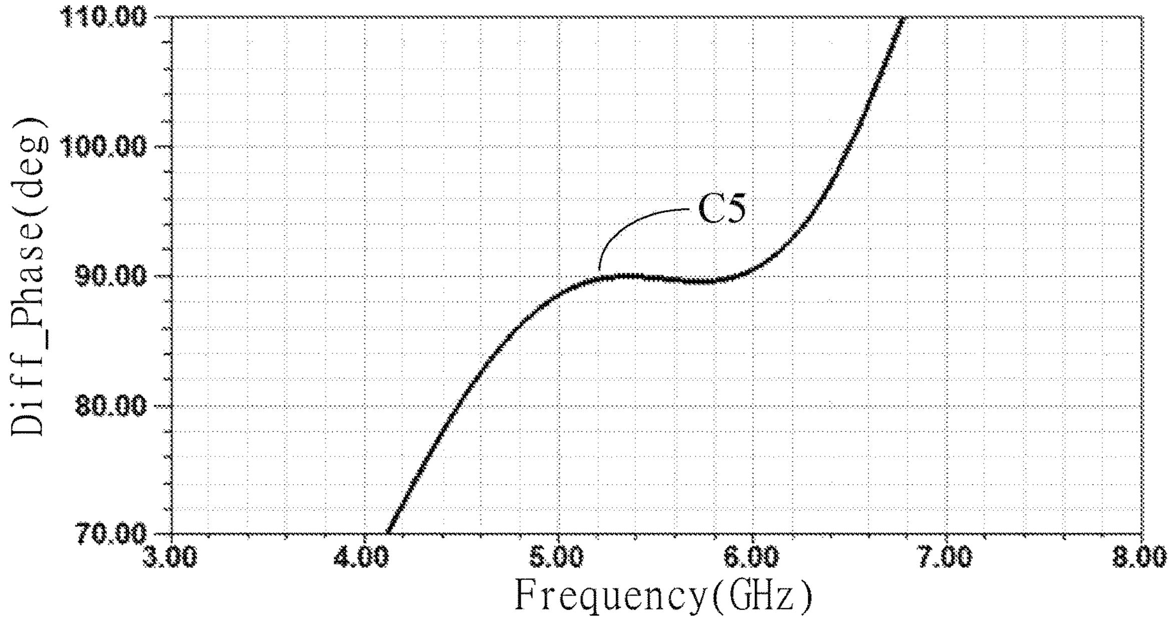
FIG. 5 is an output phase difference diagram of two output ports of a branch-line coupler, according to an embodiment of the disclosure.

FIG. 5 shows an output phase difference diagram of two output ports of a branch-line coupler 100 according to an embodiment of the disclosure. As shown in curve C5 in FIG. 5, the first output port P2 and the second output port P3 have a small phase difference at the frequency band of 4.9 GHz to 6.2 GHz. Specifically, the output phase difference of the first output port P2 and the second output port P3 is less than 10 degrees.

Figure 6:
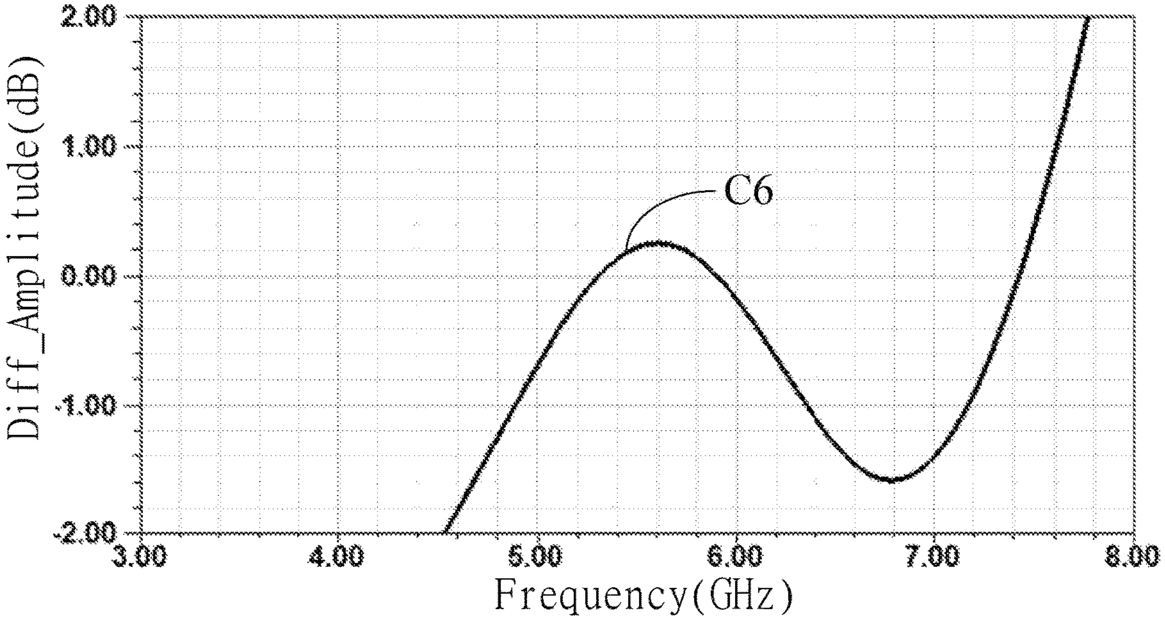
FIG. 6 shows a difference in magnitude of output between two output ports of a branch-line coupler, according to an embodiment of the disclosure.

FIG. 6 shows a magnitude difference between two output ports of a branch-line coupler 100 according to an embodiment of the disclosure. As shown in curve C6 in FIG. 6, the first output port P2 and the second output port P3 of the branch-line coupler 100 have a small difference in magnitude at the frequency band 4.9 GHz to 6.2 GHz. Specifically, the magnitude difference between the first output port P2 and the second output port P3 is less than 2 dB.

Figure 7:
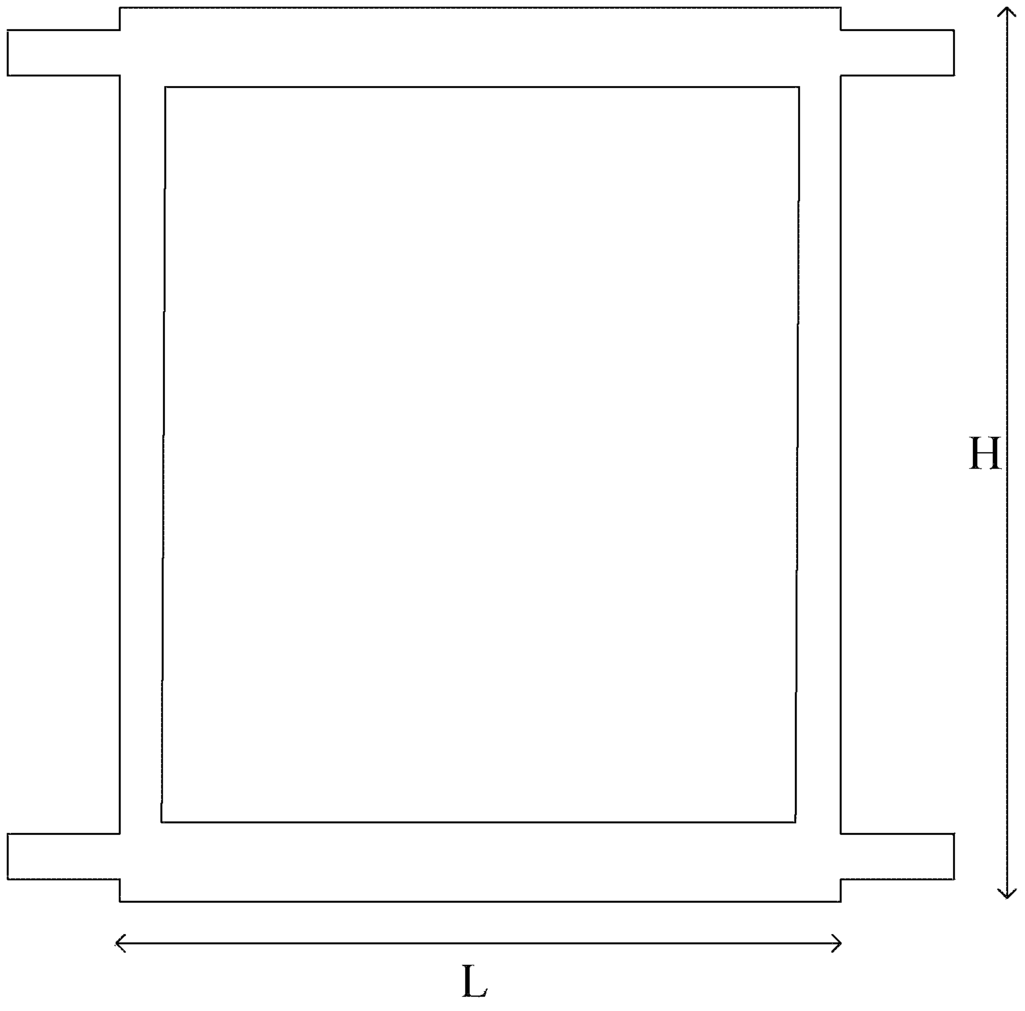
FIG. 7 is a schematic structural diagram of a conventional branch-line coupler.

FIG. 7 shows a structure of a conventional branch-line coupler. The length L of the conventional branch-line coupler is 7.4 millimeters (mm), and the width H is 9.14 millimeters (mm). The branch-line coupler 100 according to an embodiment of the disclosure adds branches on the first transmission line T1 and the second transmission line T2, and bending portions on the first bent transmission line T3 and the second bent transmission line T4. The resulting length L of the branch-line coupler 100 is 4.08 millimeters (mm), and the width H is 6.52 millimeters (mm). Compared with the conventional branch-line coupler, the size of the branch-line coupler is significantly reduced.

Figure 8:
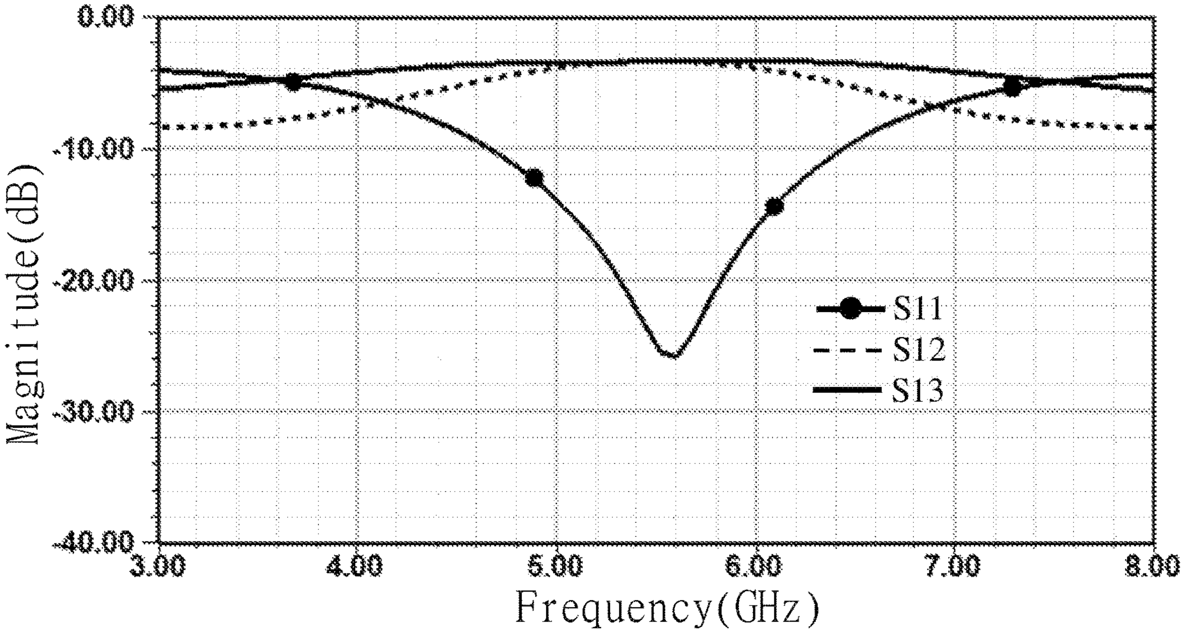
FIG. 8 is an s-parameter simulation diagram of a conventional branch-line coupler.

FIG. 8 shows an s-parameter simulation diagram of a conventional branch-line coupler. In FIG. 8, the frequency band of the conventional branch-line coupler corresponding to the parameter of S11 below −10 dB is between 4.8 GHz and 6.6 GHz, the center frequency is 5.6 GHz. The S12 and S13 parameters have 3 dB power loss at that frequency band. Comparing FIG. 3 and FIG. 8, it can be seen that the branch-line coupler 100 according to the embodiment of the disclosure achieves similar effects to the conventional branch-line coupler.

In summary, the branch-line coupler according to an embodiment of the disclosure formed by bent transmission lines and spiral branches decreases the size by 60.67% compared with a conventional branch-line coupler. In addition, the branch-line coupler has good performance at the frequency band 4.6 GHz to 6.6 GHz, and the S11 parameter is below −10 dB at the aforesaid frequency band. The magnitude of output and the output phase of the two output ports are little different and the two ports of the branch-line coupler have a high degree of isolation. The branch-line coupler according to the embodiments of the disclosure not only overcomes the disadvantage of occupying a large PCB area, but also has good performance, and is very suitable in mobile communication products.

It will be apparent to those skilled in the art that various modifications and variations can be made to the disclosure without departing from the scope or spirit of the claims. In view of the foregoing, it is intended that the present disclosure covers modifications and variations, provided they fall within the scope of the following claims and their equivalents.

What is claimed is:

1. A branch-line coupler, adapted to radio frequency circuits, comprising:

an input port;

a first output port;

a second output port;
an isolated port;
a first transmission line comprising:
a first strip transmission line comprising a first first terminal electrically connected to the input port and a first second terminal electrically connected to the first output port, wherein the first strip transmission line is extended along a predetermined direction;
a first branch transmission line electrically connected to the first first terminal, and comprising a first slot; and
a second branch transmission line electrically connected to the first second terminal, and comprising a second slot, wherein the first branch transmission line and the second branch transmission line are symmetrical around a first axis;
a second transmission line comprising:
a second strip transmission line comprising a second first terminal electrically connected to the second output port and a second second terminal electrically connected to the isolated port, wherein the second strip transmission line is extended along the predetermined direction;
a third branch transmission line electrically connected to the second first terminal, and comprising a third slot; and
a fourth branch transmission line, electrically connected to the second second terminal, and comprising a fourth slot, wherein the third branch transmission line and the fourth branch transmission line are symmetrical around the first axis;
a first bent transmission line electrically connected between the input port and the isolated port; and
a second bent transmission line electrically connected between the first output port and the second output port.

2. The branch-line coupler as claimed in claim 1, wherein the first branch transmission line further comprises a spiral branch, and the first slot is located between the spiral branch and the first bent transmission line.

3. The branch-line coupler as claimed in claim 2, wherein the first branch transmission line further comprises a strip branch, and a fifth slot located between the spiral branch and the strip branch.

4. The branch-line coupler as claimed in claim 2, wherein the first branch transmission line further comprises a L-shaped branch, and a fifth slot located between the spiral branch and the strip branch.

5. The branch-line coupler as claimed in claim 1, wherein the first bent transmission line further comprises a fifth branch transmission line, the fifth branch transmission line comprises:
a fifth first branch extending along the predetermined direction;
a fifth second branch extending along the predetermined direction; and
a fifth third branch connected to terminals of the fifth first branch and the fifth second branch near the second bent transmission line.

6. The branch-line coupler as claimed in claim 5, wherein the fifth branch transmission line further comprises a fifth fourth branch connected to the fifth third branch and extended away from the second bent transmission line.

7. The branch-line coupler as claimed in claim 1, wherein the second bent transmission line further comprises a sixth branch transmission line, the sixth branch transmission line comprises:
a sixth first branch extending along the predetermined direction;
a sixth second branch extending along the predetermined direction;
a sixth third branch connected to terminals of the sixth first branch and the sixth second branch near the first bent transmission line; and
a sixth fourth branch connected to the sixth third branch and extended away from the first bent transmission line.

8. The branch-line coupler as claimed in claim 1, wherein the first transmission line and the second transmission line are symmetrical around a second axis orthogonal to the first axis.

9. The branch-line coupler as claimed in claim 1, further comprising:
a first connection section electrically connected to the input port, the first transmission line, and the first bent transmission line;
a second connection section electrically connected to the first output port, the first transmission line, and the second bent transmission line;
a third connection section electrically connected to the second output port, the second transmission line, and the second bent transmission line; and
a fourth connection section electrically connected to the isolated port, the second transmission line, and the first bent transmission line.

10. The branch-line coupler as claimed in claim 9, wherein the first connection section, the second connection section, the third connection section and the fourth connection section are transmission lines.

11. A branch-line coupler, adapted to radio frequency circuits, comprising:
an input port;
a first output port;
a second output port;
an isolated port;
a first transmission line comprising:
a first strip transmission line comprising a first first terminal electrically connected to the input port and a first second terminal electrically connected to the first output port, wherein the first strip transmission line is extended along a predetermined direction;
a first branch transmission line electrically connected to the first first terminal, and comprising a first spiral branch and a first L-shaped branch; and
a second branch transmission line electrically connected to the first second terminal, and comprising a second spiral branch and a second L-shaped branch, wherein the first branch transmission line and the second branch transmission line are symmetrical around a first axis;
a second transmission line comprising:
a second strip transmission line comprising a second first terminal electrically connected to the second output port and a second second terminal electrically connected to the isolated port, wherein the second strip transmission line is extended along the predetermined direction;
a third branch transmission line electrically connected to the second first terminal, and comprising a third spiral branch and a third L-shaped branch; and
a fourth branch transmission line electrically connected to the second second terminal, and comprising a fourth spiral branch and a fourth L-shaped branch, wherein the third branch transmission line and the fourth branch transmission line are symmetrical around the first axis;

a first bent transmission line electrically connected between the input port and the isolated port; and a second bent transmission line electrically connected between the first output port and the second output port.

12. The branch-line coupler as claimed in claim 11, wherein the first branch transmission line further comprises a first slot located between the first spiral branch and the first bent transmission line, the second branch transmission line further comprises a second slot located between the second spiral branch and the second bent transmission line, the third branch transmission line further comprises a third slot located between the third spiral branch and the second bent transmission line, and the fourth branch transmission line further comprises a fourth slot located between the fourth spiral branch and the first bent transmission line.

13. The branch-line coupler as claimed in claim 11, wherein the first branch transmission line further comprises a fifth slot located between the first spiral branch and the first L-shaped branch.

14. The branch-line coupler as claimed in claim 11, wherein the first bent transmission line further comprises a fifth branch transmission line, the fifth branch transmission line comprises:

a fifth first branch extending along the predetermined direction;

a fifth second branch extending along the predetermined direction; and a fifth third branch connected to terminals of the fifth first branch and the fifth second branch near the second bent transmission line.

15. The branch-line coupler as claimed in claim 14, wherein the fifth branch transmission line further comprises a fifth fourth branch connected to the fifth third branch and extended away from the second bent transmission line.

16. The branch-line coupler as claimed in claim 11, wherein the second bent transmission line further comprises a sixth branch transmission line, the sixth branch transmission line comprises:

a sixth first branch extending along the predetermined direction;

a sixth second branch extending along the predetermined direction;

a sixth third branch connected to terminals of the sixth first branch and the sixth second branch near the first bent transmission line; and a sixth fourth branch connected to the sixth third branch and extended away from the first bent transmission line.

17. The branch-line coupler as claimed in claim 11, wherein the first transmission line and the second transmission line are symmetrical around a second axis orthogonal to the first axis.

18. The branch-line coupler as claimed in claim 11, further comprising:

a first connection section electrically connected to the input port, the first transmission line, and the first bent transmission line;

a second connection section electrically connected to the first output port, the first transmission line, and the second bent transmission line;

a third connection section electrically connected to the second output port, the second transmission line, and the second bent transmission line; and a fourth connection section electrically connected to the isolated port, the second transmission line, and the first bent transmission line.

19. The branch-line coupler as claimed in claim 18, wherein the first connection section, the second connection section, the third connection section and the fourth connection section are transmission lines.

20. The branch-line coupler as claimed in claim 18, wherein the first connection section, the second connection section, the third connection section and the fourth connection section are microstrip lines.

* * * * *